United States Patent [19]
Shibazaki

[11] Patent Number: 5,323,250
[45] Date of Patent: Jun. 21, 1994

[54] PIXEL-SKIPPING APPARATUS IN AN IMAGE PROCESSOR

[75] Inventor: Hiroshi Shibazaki, Kyoto, Japan

[73] Assignee: Dainippon Screen Mfg. Co., Ltd., Japan

[21] Appl. No.: 863,586

[22] Filed: Apr. 3, 1992

[30] Foreign Application Priority Data

Apr. 5, 1991 [JP] Japan .................. 3-101994

[51] Int. Cl.⁵ .................................... H04N 1/46
[52] U.S. Cl. .............................. 358/525; 358/524; 358/518; 358/433
[58] Field of Search ................. 358/75, 80, 77, 78, 358/428, 427, 451, 525, 518, 524, 504, 406, 433; 382/47

[56] References Cited

U.S. PATENT DOCUMENTS

| | | | |
|---|---|---|---|
| 4,503,469 | 5/1985 | Kato | 358/77 |
| 4,618,883 | 10/1986 | Sakamoto | 358/78 |
| 4,636,869 | 1/1987 | Tomohisa et al. | 358/77 |
| 4,686,580 | 8/1987 | Kato et al. | 358/77 |
| 4,829,370 | 5/1989 | Mayne et al. | 358/78 |
| 4,833,531 | 5/1989 | Abe et al. | 358/77 |
| 4,930,021 | 5/1990 | Okada | 358/451 |
| 4,935,822 | 6/1990 | Kubota | 358/451 |
| 4,958,237 | 9/1990 | Kubota | 358/77 |
| 5,046,119 | 3/1990 | Hoffert et al. | 358/78 |
| 5,101,443 | 3/1992 | Behrmann-Poitiers | 358/451 |
| 5,140,648 | 8/1992 | Hackett et al. | 358/451 |
| 5,159,468 | 10/1992 | Yoshida et al. | 358/451 |

Primary Examiner—Mark R. Powell
Assistant Examiner—Fan Lee
Attorney, Agent, or Firm—Ostrolenk, Faber, Gerb & Soffen

[57] ABSTRACT

An image processing apparatus functions to convert a first image derived as color-pixel data into a second image generated by a lesser number of corresponding data through a pixel-skipping process. The first image data is segmented into pixel blocks each consisting of a plurality of the color-pixel data relative to the number of second-image pixels to be generated. Each pixel block corresponds to one pixel composing the second image, and serves as an objective block from which the data to produce the corresponding second-image pixel is determined. If this determination cannot be made, the relevant color-pixel data is determined by comparative reference to color data of both the objective pixel block and that of adjacent pixel blocks. Original dot and fine-line features of the first image are thus maintained in the pixel-skipped second image.

17 Claims, 12 Drawing Sheets

F I G. 9
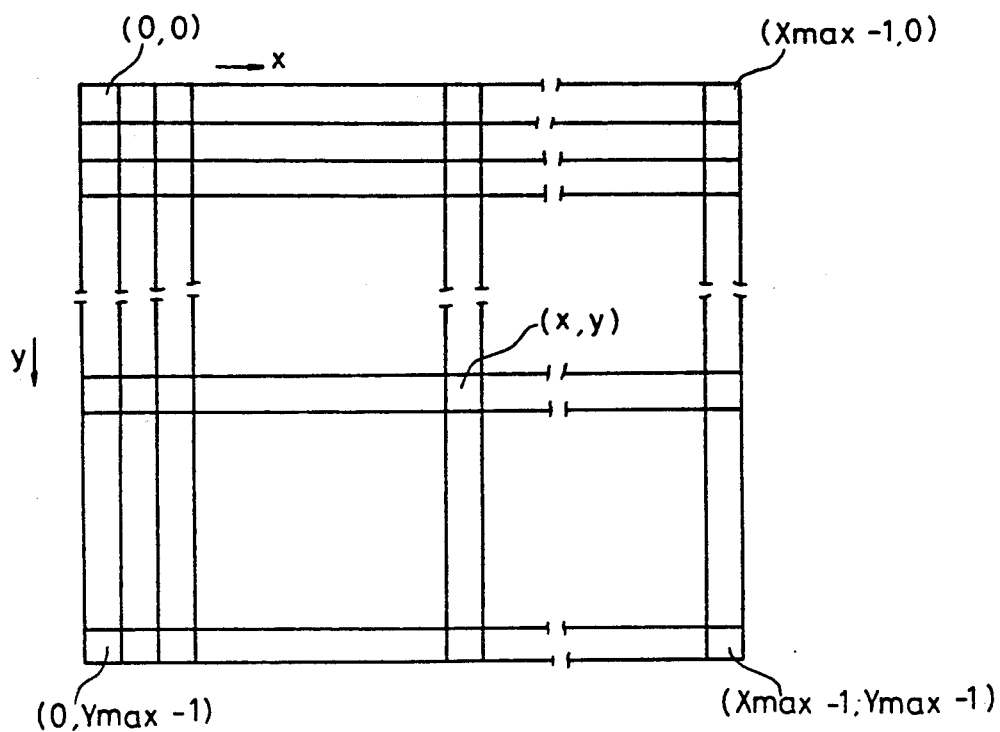
F I G. 10
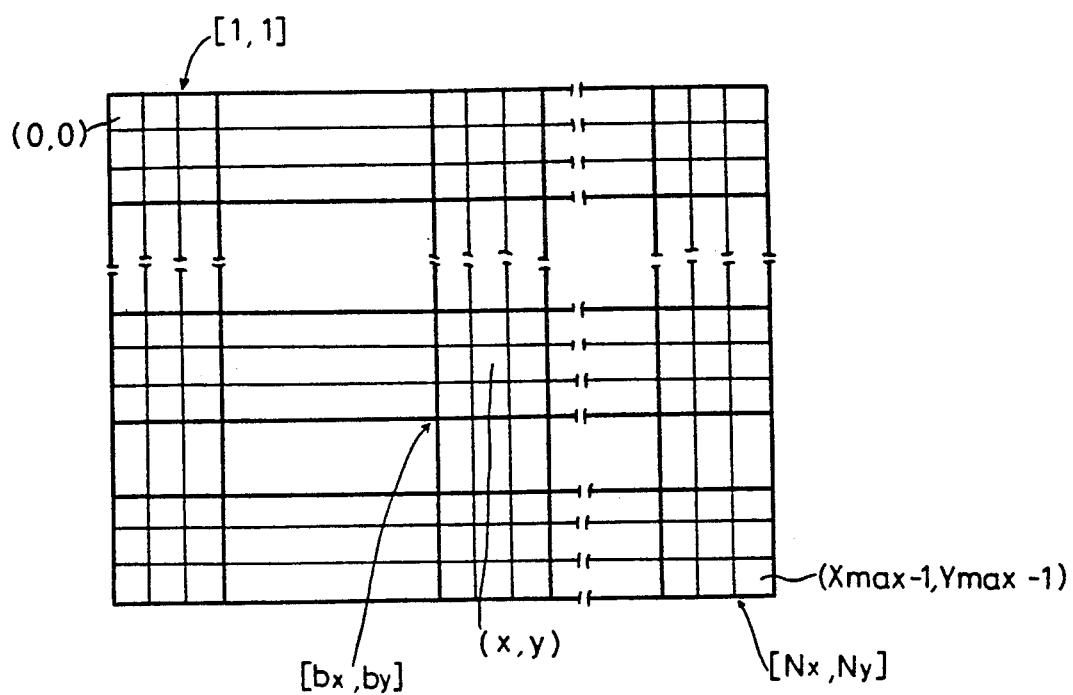

F I G. 11
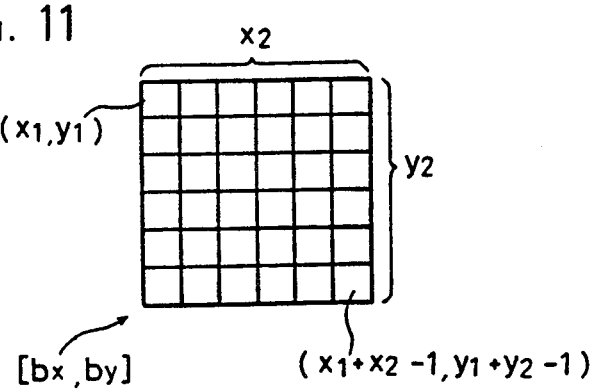
F I G. 12
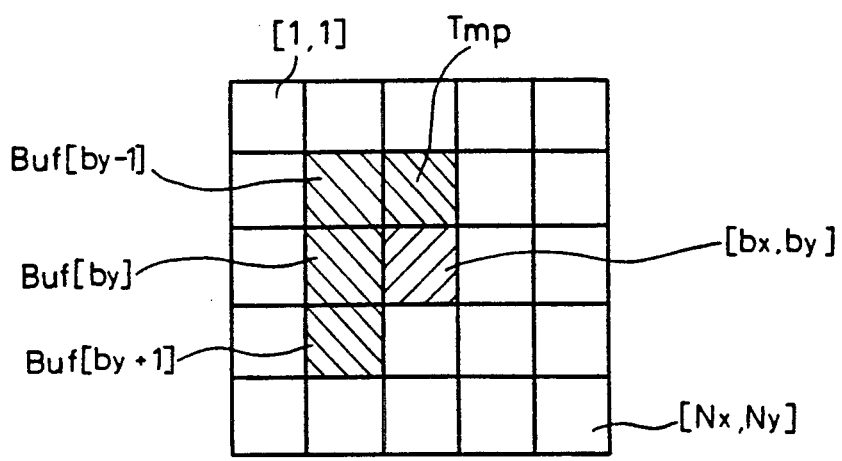
F I G. 13
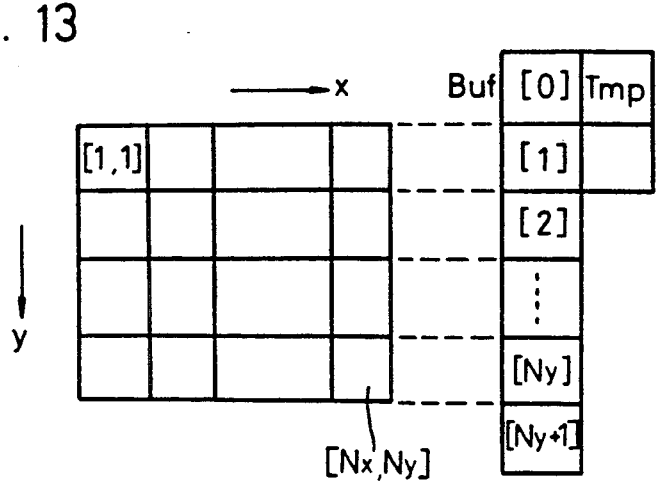

PIXEL-SKIPPING APPARATUS IN AN IMAGE PROCESSOR

BACKGROUND OF THE INVENTION

The present invention relates to image processing apparatus, and more particularly to an image processing apparatus which generates, through a pixel-skipping process, a pixel-reduced image from an original image.

In photolithographic printing, a pre-press proof is prepared by scanning a layout sheet to obtain its image information in data form. The so obtained is digitalized, whereby image correction, improvement, color adding, etc. processes may be carried out, during which the obtained image is displayed on a screen.

In order to facilitate image-processing, the on-screen image is "pixel-skipped" such that the display image is composed of a number of pixels less than that corresponding to the original, making the density of the obtained image suitable for the display, as well as for printing apparatus.

Conventionally, an image processing apparatus simply skips display image-generating pixels according to a pixel skipping ratio. However, this results in one side effect wherein dot and fine-line features of an image may disappear when the image undergoes the pixel-skipping process.

Japanese Patent Laying-Open No. 151877/1989 and Japanese Patent Laying-Open No. 152868/1989 disclose a technology which can solve the above problem of disappearing fine line features. Image processing apparatus as disclosed in the documents determine during a pixel-skipping process whether or not each pixel potentially to be skipped is isolated in color; in case an examined (objective) pixel is isolated, an adjacent pixel which is not isolated is skipped instead.

According to the foregoing technology, however, if the adjacent as well as the objective pixel is isolated, the adjacent pixel is nonetheless skipped. Consequently, dot and fine-line characteristics of the original image are degraded in the obtained image. In cases in which the skipping ratio is high, i.e., when a large number of pixels are skipped, the problem can become severe, because the number of pixels that are skipped may be larger than that of the remaining pixels forming the obtained image.

SUMMARY OF THE INVENTION

An object of the present invention is to improve the fidelity of a pixel-skipped image derived from an original in an image processing apparatus.

An image processing apparatus according to the present invention converts a first image derived as a plurality of color-pixel data into a second image generated, through a pixel-skipping process, by a lesser number of second pixels.

The first image is segmented into pixel blocks each consisting of a plurality of color-pixel data which correspond to the second-image pixels. The data which generates each second-image pixel is determined according to the color-pixel data of the first image in a corresponding objective pixel block. If the determination cannot be made, the color data corresponding to the second-image pixel in question is determined according to both the color-pixel data of the objective pixel block and that of adjacent pixel blocks.

Original dot and fine-line features of the first image are thus maintained in the pixel-skipped second image.

The foregoing and other objects and advantages of the present invention will be more fully apparent from the following detailed description.

BRIEF DESCRIPTION OF THE DRAWINGS

FIG. 9 illustrates a coordinate system corresponding to an original image;

FIG. 10 illustrates a pixel-blocking coordinate system;

FIG. 11 illustrates a coordinate system of a given pixel block;

FIG. 12 is a pixel-block diagram showing an objective block and reference blocks;

FIG. 13 is a diagram showing correspondence between reference pixel blocks and a reference data buffer;

DESCRIPTION OF THE PREFERRED EMBODIMENT

I. Structure

Figure 1:
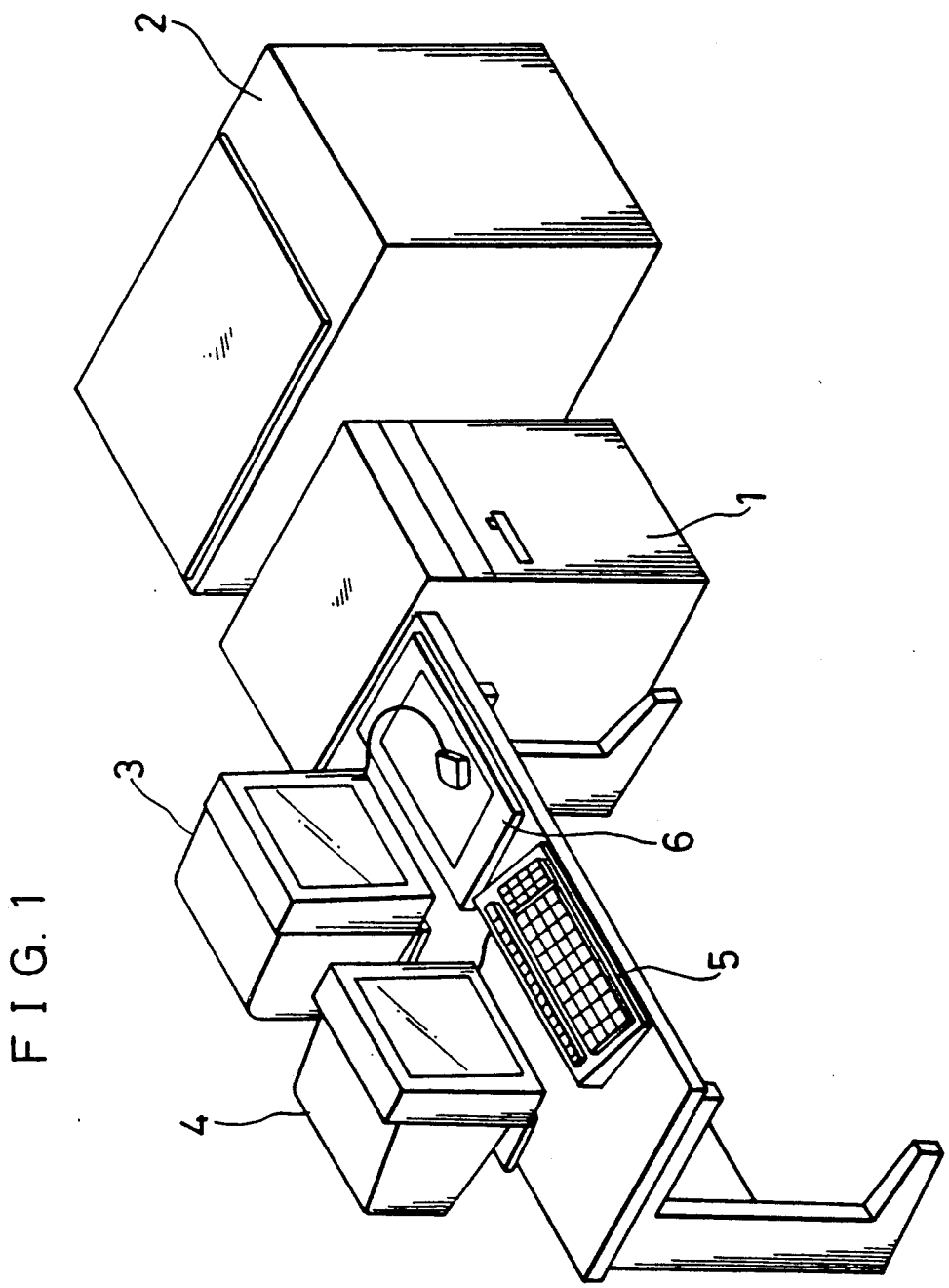
FIG. 1 is a perspective view of an image processing system employing an apparatus according to the present invention.

Referring to FIG. 1, an image processing system is shown to include a control unit 1, which incorporates a micro-computer; a scanner 2 for obtaining image data of such as characters and lines on a layout sheet; a color display (or image display) 3 for displaying an image to process; an alphanumeric character display 4; an operating keyboard 5; and an editing tablet 6.

Figure 2:
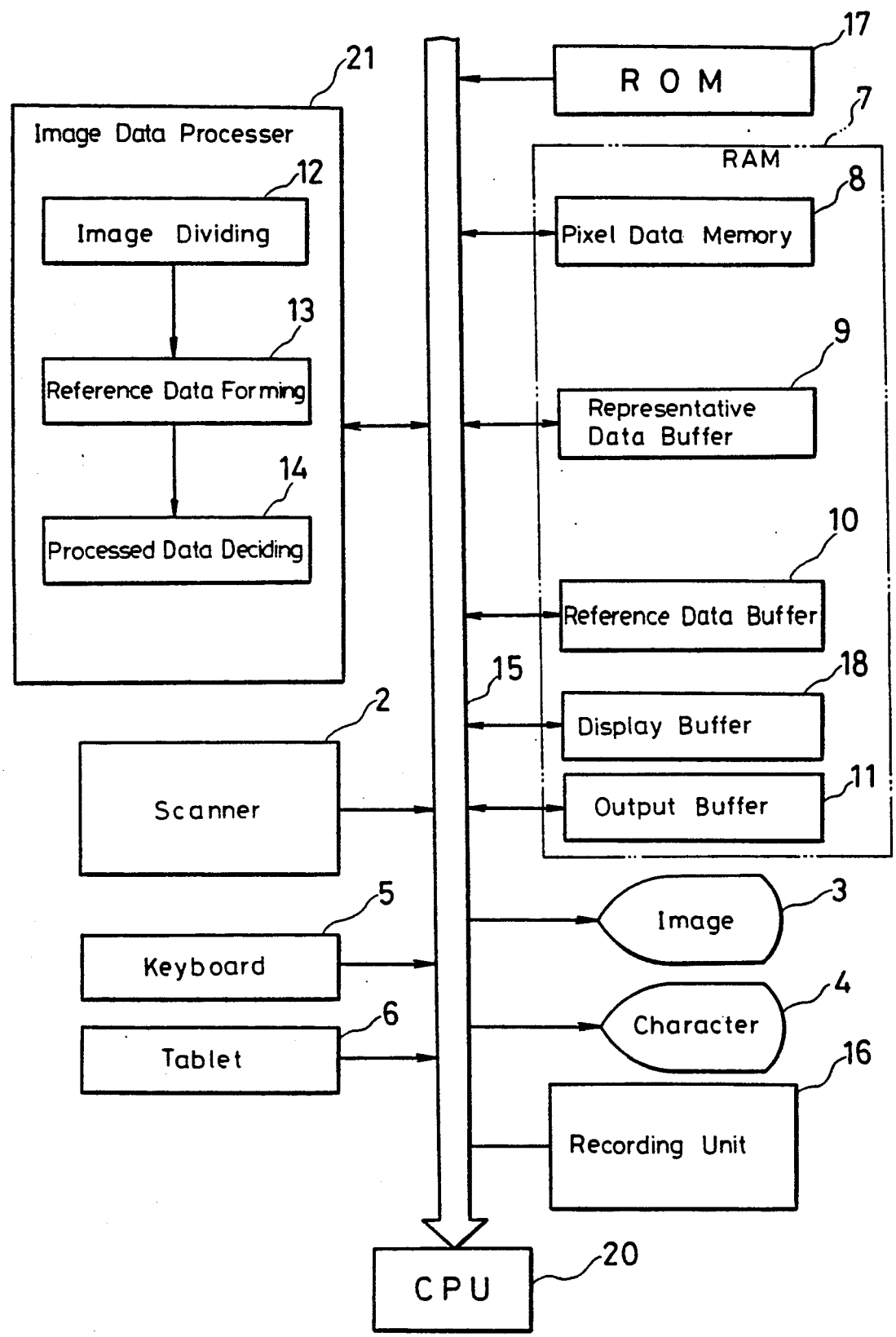
FIG. 2 is a block diagram illustrating control structure of the apparatus.

As shown in FIG. 2, the control unit 1 includes a CPU 20 which governs the entire system, a RAM 7, a ROM 17, and an image data processor 21 for making calculations during such operations as pixel skipping and pixel interpolation. The CPU 20 is connected to its associated components through a bus 15. A recording unit 16, which includes a hard-disc drive, a flexible-disc drive and a printer, is connected to the system, whereby the recording unit 16 receives processed image data for output. The scanner 2 is provided for scanning an image on a layout sheet to obtain first image data, in binary form. Commands are inputted through the keyboard 5.

The image data processor 21 is provided in order to enable such processes as correction, improvement, magnification, rotation, cut, combination and color adding to the obtained image data. FIG. 2 shows a pixel-skipping component employed in the various processes. This component includes an image segmentation part 12, a reference-data forming part 13 and a processed-data determination part 14. The image segmentation part 12 segments data from an original image into pixel blocks according to a pixel skipping ratio. The reference-data forming part 13 establishes reference data for each objective pixel block by reference to the original image data, and also decides whether processed data can be established for an objective pixel block solely on the basis of image data from that pixel block. The processed-data determination part 14 creates processed data for each pixel block by reference to the image data of the objective pixel block and/or adjacent reference blocks, after the reference-data forming part 13 makes its determination. The pixel skipping ratio is determined in accordance with pixel numbers corresponding to the original image and to the image generated on the image display 3, the magnification ratio, etc. For instance, if the original image data is divided as a 10,000×20,000 pixel field and the image display 3 provides a 2,000×4,000 pixel working field, the pixel skipping ratio would be "5". The ratio may be calculated automatically from the pixel numbers corresponding to the original image and to the display image, or it may be otherwise designated through the keyboard 5 by an operator.

The RAM 7 includes a pixel data memory 8, a representative data buffer 9, a reference data buffer 10, an output buffer 11, and a display buffer 18. The pixel data memory 8 stores data obtained from the original image by the scanner 2 consisting of color pixel data. The representative data buffer 9 is effective when the processed data from an objective pixel block is established, and it is capable of storing five first pixel-color data (Val[0] to Val [4]), in search order, which can exist in a given objective pixel block. The reference data buffer 10 stores the reference data used for establishing the processed data. As shown in FIG. 13, the buffer 10 consists of memories [0] to [Ny+1] for storing reference data for all the pixel blocks on a primary scanning line sequentially prior to the line on which the objective pixel block is located, and a temporary memory Tmp for storing data for the pixel block sequentially prior to the objective pixel block. The output buffer 11 stores one-page image data for the recording unit 16. The remaining buffers 9, 10, 11 and 18 will be described later.

II. Image Processing Control

Figure 3:
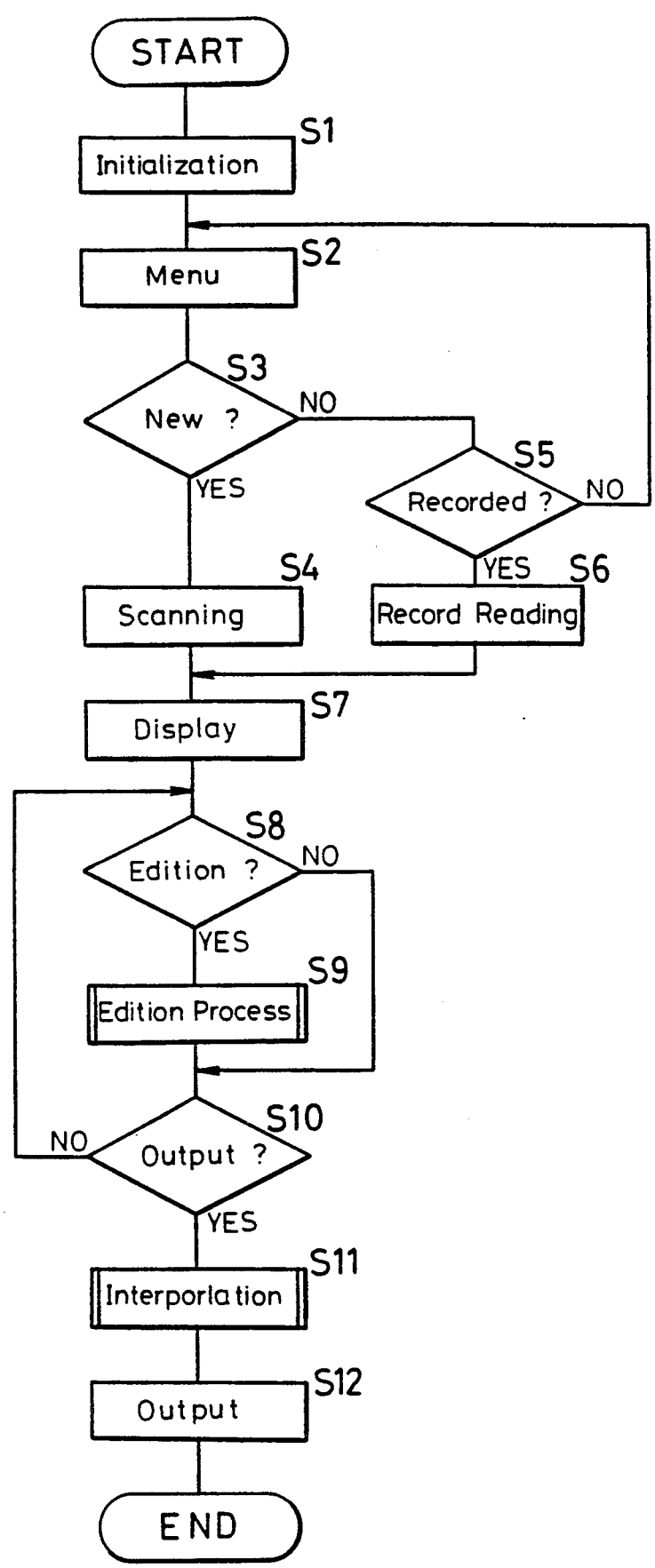
FIG. 3 is a main routine flowchart therein.
Figure 4:
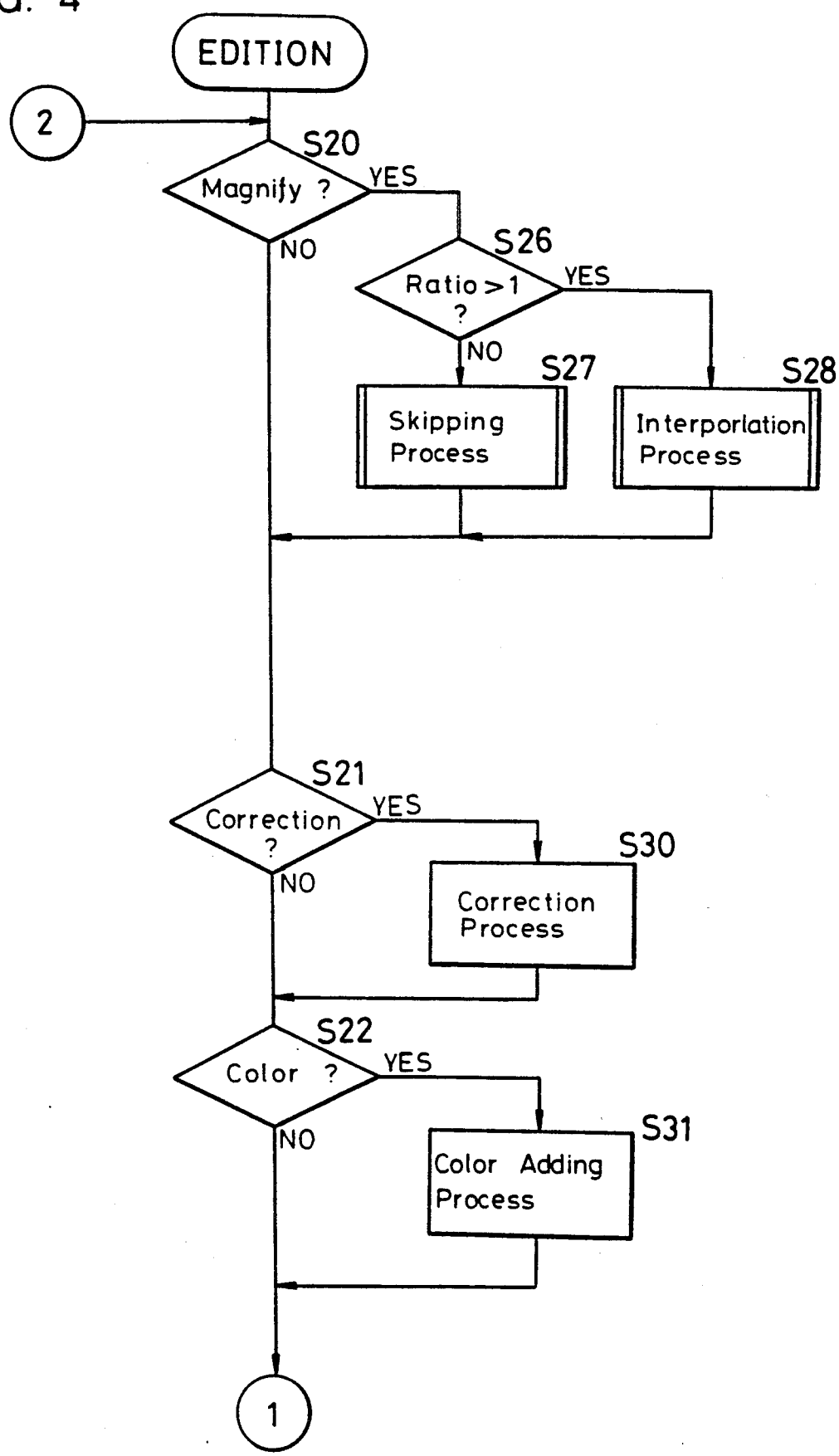
FIGS. 4 and 5 are image-editing process flowcharts.

In the control program illustrated by the flow charts of FIGS. 3 and 4, an initialization is carried out at step S1. An operation menu is displayed on the character display 4 at step S2. It is then determined whether the scanning of a new image is commanded at step S3, and it is determined whether retrieving image data stored in, for example, a hard disc memory is commanded at step S5.

When a command to scan new image data is issued, the program proceeds from step S3 to step S4. At step S4, the scanner 2 scans a layout sheet, and the obtained image data is stored in the image data memory 8. Otherwise, if a command to retrieve image data stored in the recording unit 16 is issued, the program proceeds from step S5 to step S6, wherein recorded image data retrieved from the recording unit 16 is stored into the image data memory 8. After all the requested image data is stored, step S7 is executed so as to provide pixel-skipped image data to display a processed image on the image display 3 in accordance with its resolution A pixel-skipping process is then carried out upon the image data stored in the image data memory 8; the obtained image data is temporarily stored in the output buffer 11; and then the obtained image data is displayed on the image display 3. The pixel skipping ratio is determined relative to the image-reading resolution of the scanner 2 and that of the image display 3.

At step S8, it is determined whether an editing operation is commanded. If not, the program proceeds from step S8 to step S10. If an editing operation is otherwise commanded, step S9 is executed whereby the commanded editing operation is carried out. Referring now to the flow charts of FIGS. 4 and 5, the editing operation at step S9 will be described.

Figure 5:
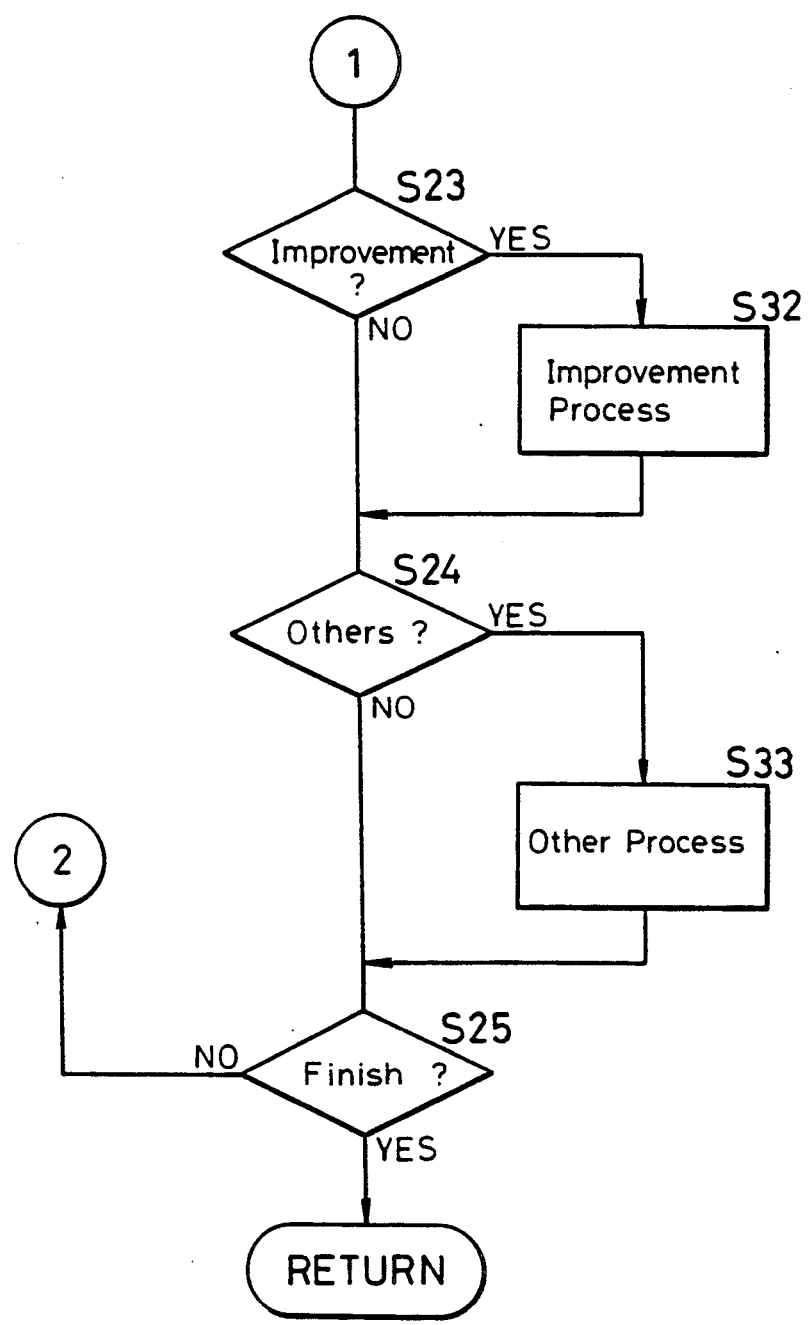

When an editing operation is commanded through the tablet 6, it is determined at steps S20 to S23 in FIGS. 4 and 5, respectively; whether data magnification (that is, pixel skipping or interpolation) is commanded; whether correction, such as removing "pin holes" from the image, is commanded; whether color enhancement is commanded; and whether an improvement operation such as image shift or shadowing is commanded. Furthermore, it is determined at step S24 whether any other operations are commanded, and it is determined at step S25 whether a command to terminate operation has been issued.

If the magnification command is issued, the program proceeds from step S20 to step S26 of FIG. 4. At step S26, it is determined which of either pixel skipping or interpolation is to be carried out, depending upon whether the magnification ratio (that is, the ratio of the pixel number corresponding to the processed image data to that corresponding to the original image data) is more than one or not.

When the determination at step S26 is "NO", step S27 is executed whereby a pixel skipping process is carried out, as will be described below. The process is determined by the pixel skipping ratio input by an operator, and is therefore different from a pixel skipping operation determined by the pixel skipping ratio defined by the resolution of the image display 3. Instead of step S27, when the decision at step S26 is "YES", step S28 is executed, whereby the image data processor 21 proceeds to carry out an interpolation process upon the image data.

When a correction command is issued, the program proceeds from step S21 to step S30. At step S30, the processor 21 is commanded to perform an image data correct and display process. When a color enhancement command is issued, the program proceeds from step S22 to step S31. At step S31, the processor 21 is commanded to perform an image data color enhancement and display process. When an improve command is issued, the program proceeds from step S23 to step S31 in FIG. 5. At step S32, the processor 21 is commanded to perform an image data improve and display process. When one of the other miscellaneous processes is commanded, the program proceeds from step S24 to step S33. At step S33, the image data processor 21 performs the designated process and its related display process.

The image obtained at each of steps S27 to S33 is displayed on the image display 3, and is formed in dependency upon the pixel skipping ratio corresponding to the image resolution of the image display 3. The pixel-skipped image data is used only for the output display of the image, and not for any editing operations performed on it.

When a finish editing command is issued, the determination at step S25 becomes "YES", whereby the program returns to the main routine shown by the flow chart of FIG. 3. Otherwise, the program returns to step S20 (FIG. 4) to await the next edit command.

After editing, when a data output command is issued at step S10 of FIG. 3, the program proceeds to step S11. At step S11, an interpolation process is carried out employing an interpolation ratio corresponding to the resolutions of the edited image data and the recording unit 16. The image data obtained through the interpolation process is temporarily stored in the output buffer 11. The stored image data is then delivered as output to the recording unit 16 at step S12.

Pixel Skipping

The pixel skipping operation at step S27 and the separate pixel skipping operation executed for the display of an image on the image display 3 include the following steps in common:

(1) Calculating the number of pixels derived along the "vertical", or y (primary) scanning direction and the number derived along the "horizontal", or x (secondary) scanning direction in each pixel block corresponding to a pixel skipping ratio;

(2) Determining whether it is possible to establish pixel-skipped color-pixel data solely from an objective pixel block, which amounts to determining whether the color data in the objective pixel block are identical;

(3) Employing the color-pixel data as image-processed data for the objective pixel block, when all the color data in the objective pixel block are identical; and (4) Determining the processed data from the color data of the objective pixel block and adjacent pixel blocks, when the objective block contains color-pixel data of different colors.

Now, the pixel skipping process will be described with coordinate systems and buffers defined as follows: FIG. 9 shows a coordinate system corresponding to an original image and having origin (0,0) at the upper left corner. In the coordinate system, the number of pixels in the secondary scanning direction (x) is $X_{max}$ and a number of pixels in the primary scanning direction (y) is $Y_{max}$. Accordingly, the pixel located at the right lower corner is designated by coordinates $(X_{max-1}, Y_{max-1})$.

Assuming that processed image data includes a number of pixels $N_x$ in secondary scanning direction (x) and a number of pixels $N_y$ in primary scanning direction (y), the pixel skipping ratio $M_x$ in direction x is:

$$M_x = X_{max}/N_x \quad (\leqq 1.0)$$

and the pixel skipping ratio $M_y$ in direction y is:

$$M_y = Y_{max}/N_y \quad (\leqq 1.0)$$

In accordance with the pixel skipping ratios, the original image can be segmented into blocks as shown in FIG. 10, wherein the left uppermost block including the origin pixel (0,0) is referred to by the coordinates [1,1], and the right lowermost block is referred to by $[N_x, N_y]$. In the pixel block coordinate system, an objective block in the pixel skipping process may be designated $[b_x, b_y]$. As shown in FIG. 11, each pixel block includes a number of pixels $x_2$ in direction x and a number of pixels $y_2$ in direction y, wherein the left uppermost pixel is referred to by $(x_1, y_1)$, and the right lowermost pixel is referred to by $(X_1+X_2-1, Y_1+Y_2-1)$.

As shown in FIG. 12, a total of four pixel blocks, located to the left of and above the objective pixel block [bx,by] are used as reference data blocks when the processed data cannot be established solely by reference to the data in the objective pixel block $[b_x, b_y]$. Therein, the reference data of the pixel block above is stored in a temporary buffer Tmp of the reference data buffer 10, the reference data of the upper-left pixel block is stored in location Buf[$b_y-1$] of the buffer 10, the reference data of the middle-left pixel block is stored in location Buf[$b_y$] of the buffer 10, and the reference data of the lower-left pixel block is stored in location Buf[$b_y+1$] of the buffer 10. Hypothetical locations of the pixel blocks and the corresponding data stored into the buffer 10 are shown in FIG. 12.

The processed data are stored in the pixel data memory 8, wherein the processed data for pixel block [1,1] is stored in address Out[1,1], and the processed data for pixel block [$N_x, N_y$] is stored in address Out[$N_x,N_y$].

Figure 6:
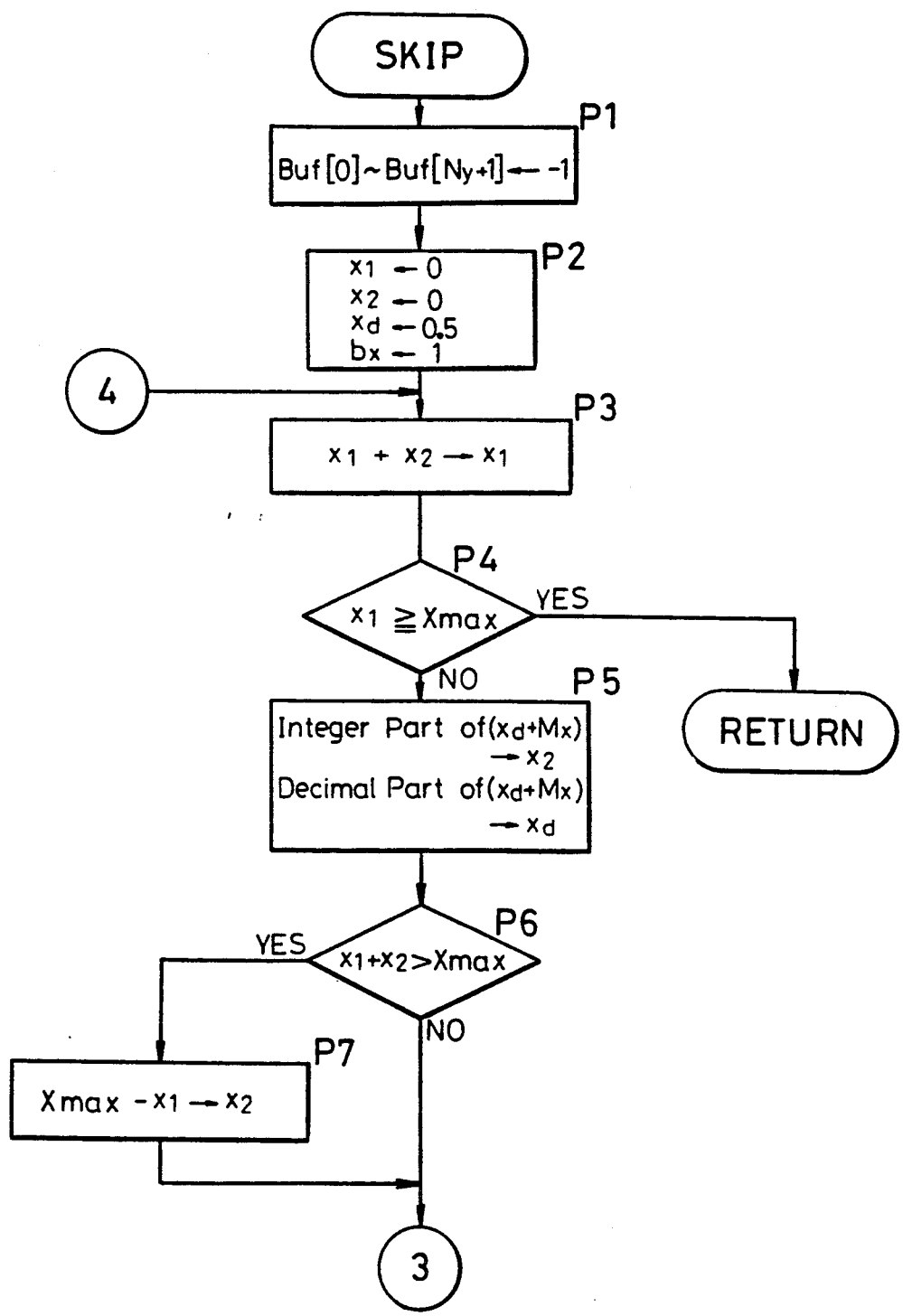
FIGS. 6, 7 and 8 are pixel-skipping process flowcharts.
Figure 7:
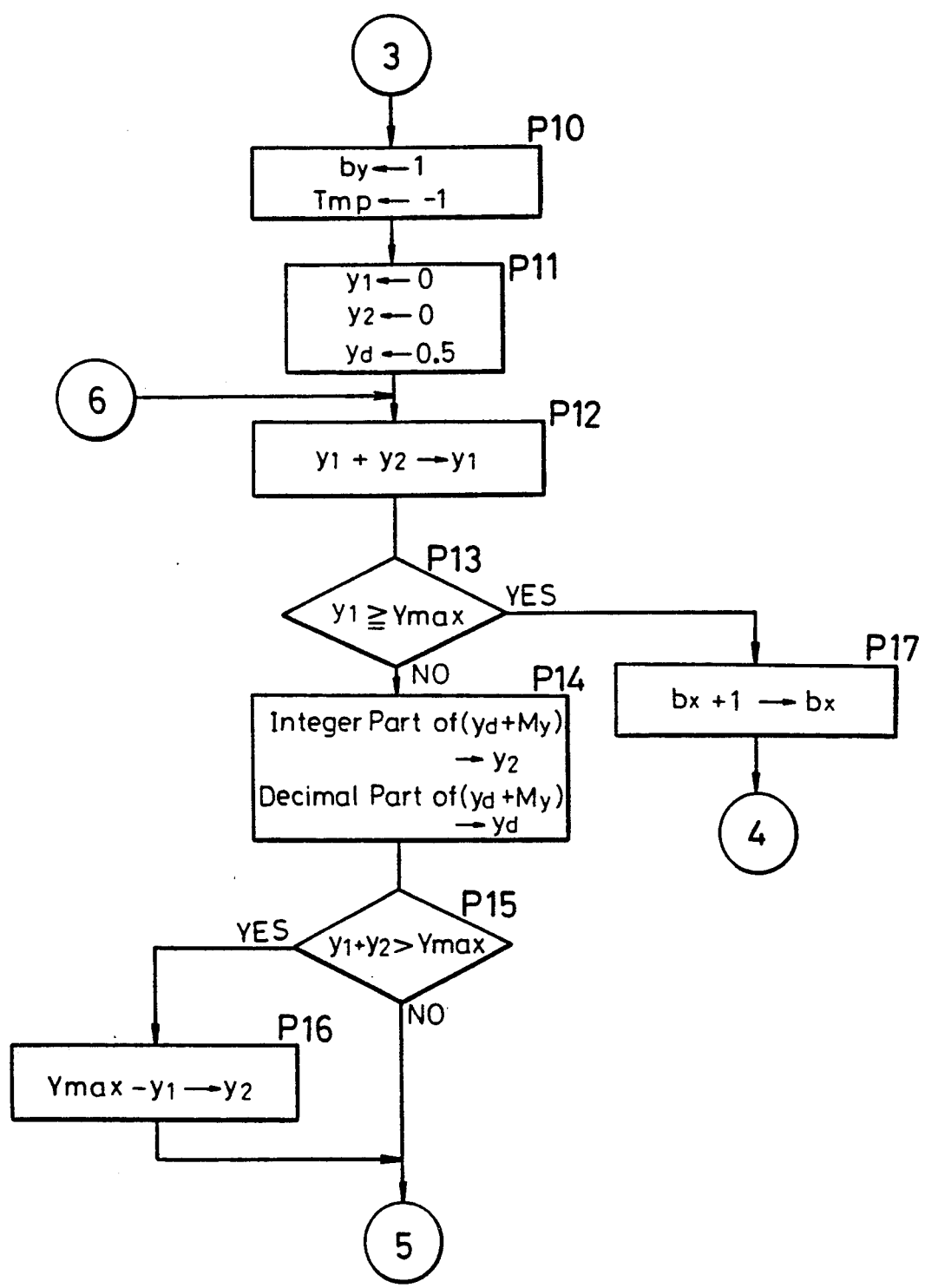

Referring to the flowcharts of FIGS. 6 to 8, the pixel skipping process of the image data processor 21 will now be described.

At step P1, the reference data buffer 10 is initialized by storing "−1"s in all the addresses. Then, the number of pixels in one pixel block in direction x is determined at steps P2 to P7 so as to correspond to the pixel skipping ratio for direction x. That is, at step P2, "0"s are stored in both $x_1$ and $x_2$, "0.5" is stored in $x_d$, and "1" is stored as the x-axis coordinate $b_x$ of the objective pixel block. The decimal number $X_d$ is provided for use in making an integer of the pixel number in direction x of the objective pixel block.

At step P3, $x_1$ is substituted for $(x_1+x_2)$. Then, at step P4 it is determined whether $x_1$ obtained at step P3 is equal to or more than $X_{max}$.

When the determination is "YES" at step P4, it signals the end of the pixel skipping process, and the program returns to the main routine.

When $x_1$ is less than $X_{max}$, step P5 is executed whereby the integer part of $(x_d+M_x)$ is determined as the pixel number $x_2$ along the x-axis for one pixel block, and then a decimal fraction is used as the number $x_d$ for the next pixel block. At step P6, it is determined whether $(x_1+x_2)$ is more than $X_{max}$. When $(x_1+x_2)$ is more than $X_{max}$, step P7 is executed whereby number $x_2$ is substituted for $(X_{max}-X_1)$. When the determination at step P4 is "NO", or upon the execution of step P7, step P10 as shown in FIG. 7 is executed.

At step P10 and the following steps, the number of pixels along the y-axis of the objective pixel block is determined corresponding to the pixel skipping ratio My, as follows: At step P10 the y-axis coordinate $b_y$ of the objective pixel block is set at "1", and the temporary buffer Tmp is set at "−1". Then, $y_1$ and $y_2$ of the block is set at "0", and the decimal number $y_d$ is set at "0.5". The number $y_d$ is provided for making an integer of the pixel number of the objective pixel block, as is likewise the case for $x_d$. After the numbers are set, $y_1$ is substituted for $(y_1+y_2)$ at step P12. Then, it is determined at step P13 whether $y_1$ of step P12 is equal to or larger than $Y_{max}$ along the y-axis. When "YES" is concluded at step P13, step P17 is executed, whereby $b_x$ is incremented by one, and then the program returns to step P3 of FIG. 6.

When $y_1$ is less than $Y_{max}$ at step P13, step P14 is executed whereby the calculation $(y_d+Y_y)$ is made, and the integer part of the obtained number is used as the pixel number $y_2$ of the objective pixel block along the y-axis and the decimal fraction of the obtained number is used as $y_d$ for the next pixel block. It is then determined at step P15 whether $(y_1+y_2)$ is larger than $Y_{max}$. When $(y_1+y_2)$ is larger than $Y_{max}$, step P16 is executed whereby $Y_2$ is substituted for $(Y_{max}-y_1)$. Upon the execution of step P16, or if the conclusion of step P15 is concluded "NO", step P20 of FIG. 8 is executed.

According to the foregoing processes, if the pixel skipping ratio Mx in x-axis is 2.5, for example, the number of pixels in the pixel blocks along the x-axis would be 3, 2, 3, 2, and so on.

Figure 8:
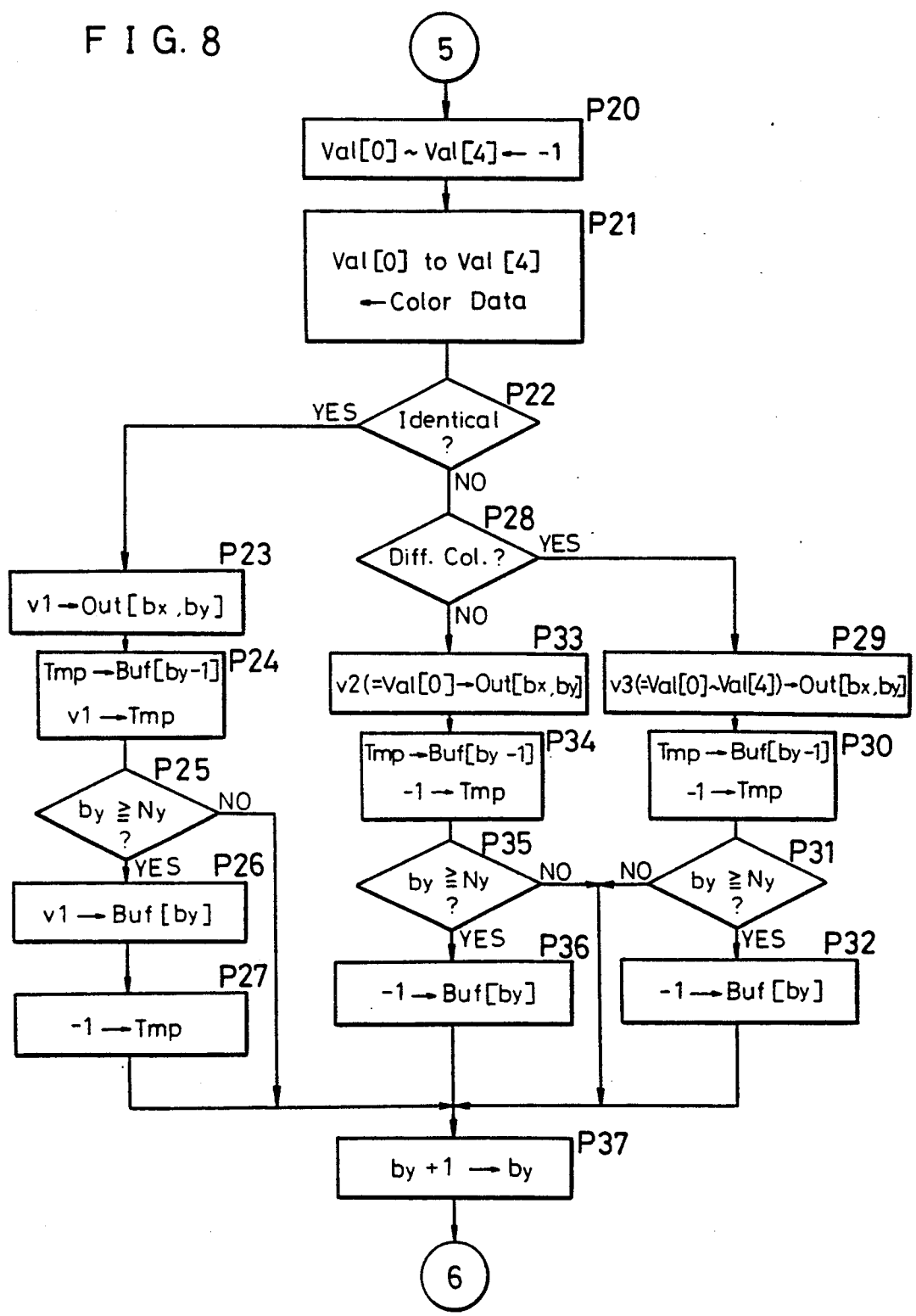

At step P20 and the following steps shown in FIG. 8, reference data and processed data of the pixel blocks are established.

At step P20, Val[0] to Val[4] are all set at "−1" in order to initialize the representative data buffer 9. Subsequently, the pixel color data in the objective pixel block are read $y_2$ times along the y-axis direction for each of $x_2$ times along the x-axis direction from the position $(x_1, y_1)$, and the read colors are stored in five addresses Val[0] to Val[4]. The pixel color data includes color numbers wherein for example. "0,1,2,3,4" corresponding to white, black, red, blue, and green, respectively.

Figure 14:
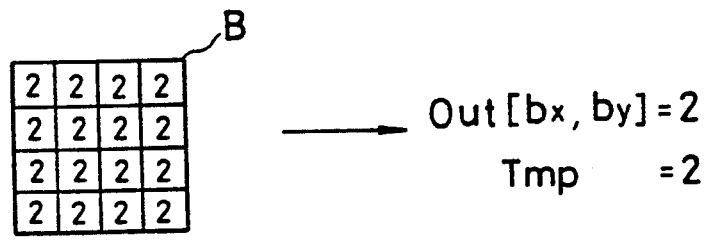
FIG. 14 is a diagram showing an objective block of one pixel color.

In a case in which all the data composing the objective pixel block are identically "2" as shown in FIG. 14, Val[0] will have "2" as representative data, but the other Val[1] to Val[4] remain with "−1". The representative data buffer 9 includes five addresses because there are four reference pixel blocks employed in the following algorithm, thus five (=4+1) is appropriate for the representative data buffer 9.

Then, it is determined at step P22 whether all the pixel data of the objective pixel block are identical, that is, whether the objective pixel block includes only one color. For example, when Val[0] contains valid data and the remaining addresses contain the invalid data "−1", it is concluded that the representative data buffer 9 includes only one representative data.

Thus, when the conclusion at step P22 is affirmative, step P23 is executed whereby data $v_1$ stored in Val[0] is stored in the pixel data memory 8 as the processed data Out[$b_x, b_y$] for the objective pixel block. Then, step P24 is executed whereby the value in the reference buffer Buf[$b_y - 1$] corresponding to the position [$b_y - 1$] sequentially prior to the position [$b_y$] in the objective pixel block along the y-axis is replaced with the value in the temporary buffer Tmp, and then the temporary buffer Tmp is set at $v_1$.

At step P25, it is determined whether the objective pixel block is the last block along the y-axis. If this is the case, step P26 is executed whereby Buf[$b_y$] is set at $v_1$, and then step P27 is executed whereby the temporary buffer Tmp is set at "−1".

When at step P22 there are a plurality of the representative data, i.e., when the objective pixel block includes data of different colors, step P28 is executed. It is determined at step P28 whether the data of Val[0] to Val[4] of the representative data buffer 9 is different from the data of the temporary buffer Tmp, Buf[$b_y - 1$], Buf[$b_y$] and Buf[$b_y + 1$]. When the reference data in the reference data buffer 10 is different from that contained in the representative data buffer 9, step P29 is executed whereby the different data $v_3$ first stored in Val[0] to Val[4] is stored in the pixel data memory 8 as processed data Out[$b_x, b_y$] of the objective pixel block. Then, Buf[$b_y - 1$] is stored as the data in temporary buffer Tmp, and the temporary buffer Tmp is set to "−1", at step P30. It is then determined at step P31 whether the objective pixel block is the last block along the y-axis. When this is the case, step P32 is executed whereby Buf[$b_y$] of the reference data buffer 10 is set to "−1".

When, at step P28, the representative data buffer 9 includes no data other than the data in the reference data buffer 10, step P33 is executed whereby the first valid data $v_2$ (or Val[0]) in the objective pixel block is stored in the pixel data memory 8 as the processed data Out[$b_x, b_y$] of the objective pixel block. Then, step P34 is executed whereby the data in the temporary buffer Tmp is stored into Buf[$b_y - 1$], and then the temporary buffer Tmp is set to "−1". At step P35, it is determined whether the objective pixel block is the last block along the y-axis. If this is the case, step S36 is executed whereby Buf[$b_y$] of the reference data buffer 10 is set to "−1".

When $b_y$ is less than $N_y$, i.e., when the objective pixel block is not the last block at either step P25, P31 or P35, step P37 is executed. Step P37 is otherwise executed after the completion of either step P27, P32 or P36. At step P37, $b_y$ is incremented by one for the process to proceed with the succeeding block along the direction of the y-axis.

After the execution of step P37, the program returns to step P12. The foregoing process is carried out for all the pixel blocks, whereby processed data for all the pixel blocks are established.

EXAMPLES

FIGS. 14 to 18 show some examples of processed data and reference data.

FIG. 14 shows an objective pixel block B containing identical pixel data. The objective pixel block B has the identical pixel data "2", wherein Out[$b_x, b_y$] is set at "2" at step P23, and the temporary buffer Tmp of the reference data buffer 10 is set at "2" at step P24.

Figure 15:
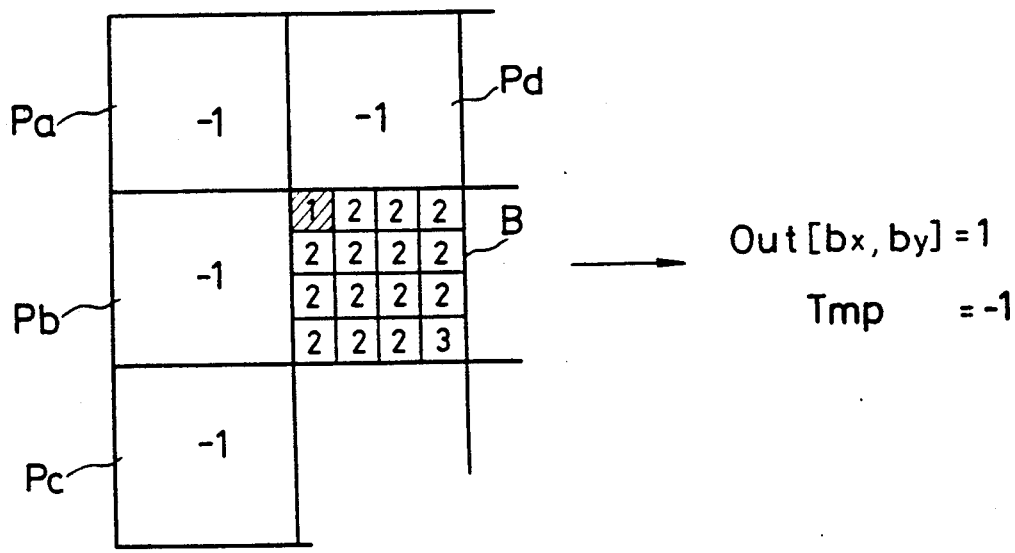
FIGS. 15 to 18 are diagrams showing objective blocks which contain more than one pixel color.

FIG. 15 shows another objective pixel block B containing three kinds of color data ("1", "2" and "3") and the reference blocks Pa, Pb, Pc and Pd for which reference data in the reference data buffer 10 are "−1". In this case, the judgment at step P22 is "NO", so that step P28 is executed. At step P28, the judgment is "YES", since the objective pixel block B contains color data different from the data in the reference data buffer 10. Accordingly, at step P29, Out[$b_x, b_y$] is set at "1", which is the first data different from the data of the reference data buffer 10, and at step P30, the temporary buffer Tmp is set to "−1".

Figure 16:
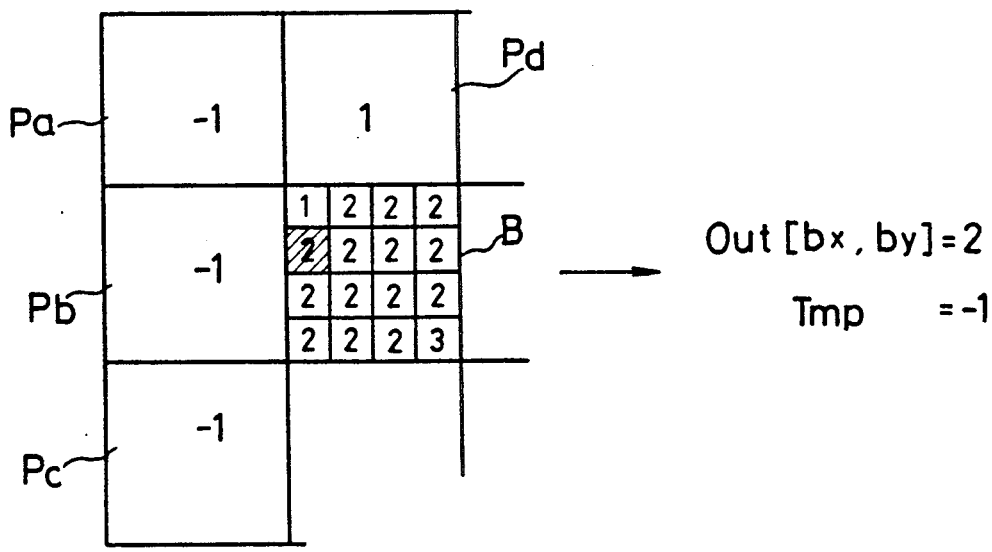

FIG. 16 shows an example in which the data of the temporary buffer Tmp corresponding to the reference pixel block Pd is "1", the other data in the reference data buffer 10 corresponding to the reference pixel blocks Pa, Pb, and Pc are "−1", and the objective pixel block B includes three kinds of color data "1", "2" and "3". In this case, since the judgment at step P22 is "NO" and the judgment at step P28 is "YES", Out[$b_x, b_y$] of the output buffer 11 is set at "2", which is the first data different from the data stored in the reference data buffer 10 at step P29, and then the temporary buffer Tmp is set to "−1" at step P30.

Figure 17:
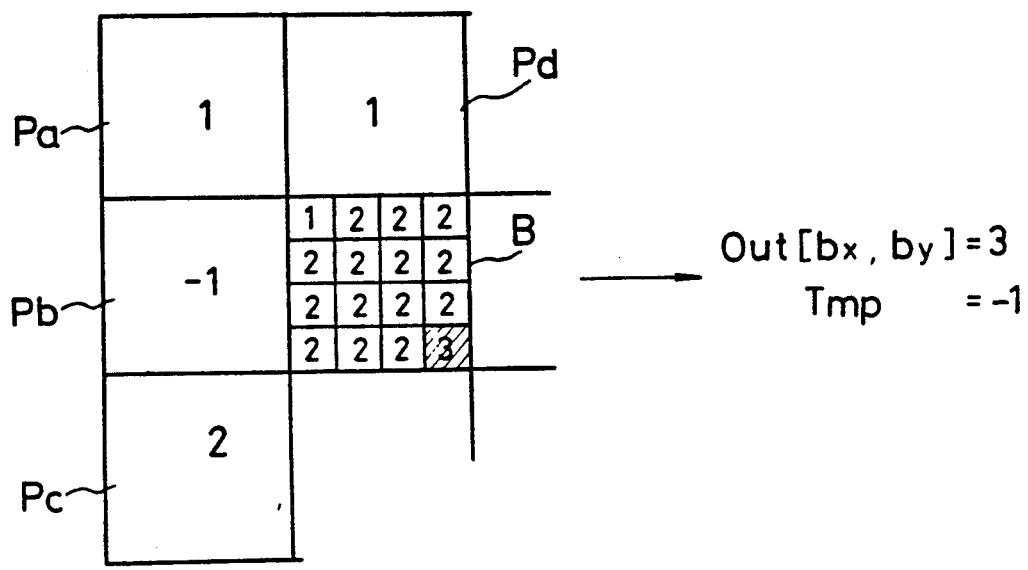

FIG. 17 shows another example similar to that of FIG. 16, in which the reference data buffer 10 includes the data "1", "−1" and "2". In this case, the processed data is made "3" which is the first data different from the data stored in the reference data buffer 10, and the temporary buffer Tmp is set at "−1" to step S30.

Figure 18:
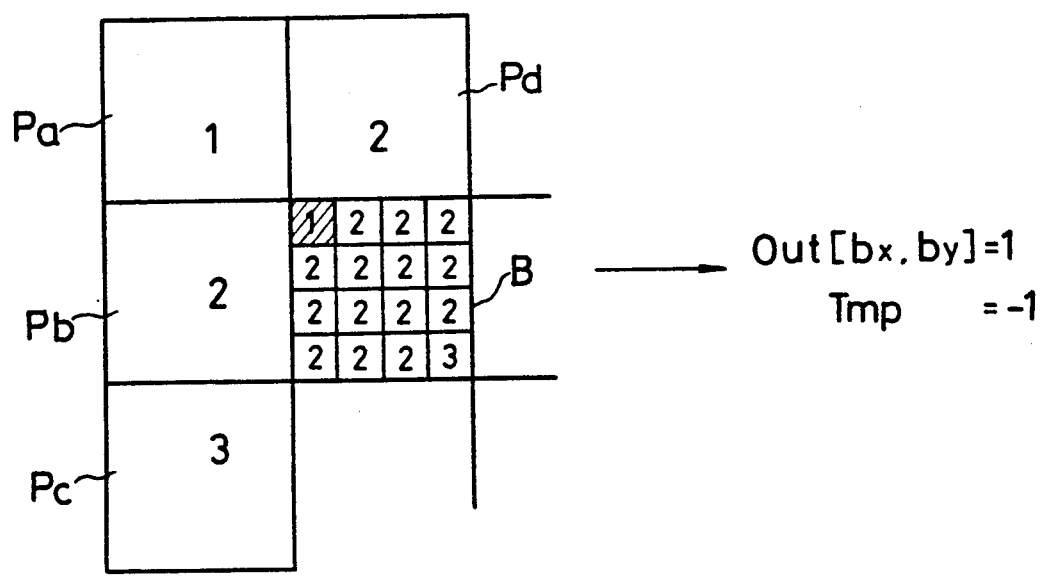

FIG. 18 shows yet another example in which the temporary buffer Tmp stores "2" for the reference pixel block Pd, and the other data in the reference data buffer 10 are "1", "2" and "3", respectively. In this case, the judgment at step P28 is "NO", since the objective pixel block B has no data different from those of the reference data buffer 10. The processed data at step P33 is set at "1" which is the color data of the first pixel in the objective pixel block B. The temporary buffer Tmp is set to "−1" at step P34.

As described by the foregoing examples, the pixel skipping process is implemented as follows: Image information is segmented into a plurality of pixel blocks. It is then judged for a pixel skipping process whether the pixel data in an objective pixel block are identical. If the pixel data in the pixel block are not identical, the pixel skipping process is carried out with reference to the pixel data of the adjacent pixel blocks as well as to the objective pixel block. Accordingly, dot and fine-line characteristics of the original image are maintained through the pixel skipping process. Moreover, calculation during the pixel skipping process is simple, since the processed data is determined by referring to the data of the objective and adjacent pixel blocks only. Furthermore, the pixel skipping process requires only a small buffer memory and the calculations are facilitated, since the processed data is determined by referring to the previously determined data positioned in the upper stream-in the scanning flow direction.

MODIFICATION

If a large reference data buffer is provided, reference data for all the pixel blocks may be obtained and stored in the reference data buffer before the pixel skipping process. The eight pixel blocks immediately surrounding an objective pixel block may then be used as reference pixel blocks, in which case processed data of different accuracy from those of the foregoing examples could be obtained.

Various details of the invention, such as modified algorithms for determining processed color-pixel image data, may be changed without departing from the spirit or scope of the invention. Furthermore, the foregoing description of the embodiments according to the present invention is provided for the purpose of illustration only, and not for the purpose of limiting the invention as defined by the appended claims and their equivalents.

What is claimed is:

1. A pixel skipping apparatus, functional in an image processing apparatus, which converts a first image derived as a plurality of first color-pixel data into a second image generated by a lesser number of second color-pixel data, comprising:
    means for segmenting said first color-pixel data into a plurality of pixel blocks each comprising a given plurality of said first color-pixel data, wherein each of said second color-pixel data corresponds to one of said pixel blocks;
    first means for calculating each of said second color-pixel data according to first color-pixel data contained in a corresponding objective pixel block among said pixel blocks;
    second means for calculating said second color-pixel data, including first means for storing first color-pixel data from said objective pixel block, and second means for storing first color-pixel data of said pixel blocks which are in the vicinity of said objective pixel block, wherein said first means for calculating cannot execute its function;
    in the event said first means for storing color-pixel data contains color-pixel data different from that which is stored in the second means for storing color-pixel data, said second means for calculating being operative to produce color-pixel data corresponding to one pixel of said second image according to said different color-pixel data stored in said first means for storing color-pixel data, and
    in the event that said first means for storing color-pixel data contains color-pixel data which is identical to that which is stored in said second means for storing color-pixel data, said second means for calculating being operative to produce color-pixel data corresponding to one pixel of said second image according to one of said identical color-pixel data stored in said first means for storing color-pixel data; and
    means for generating a second pixel according to said second color-pixel data as calculated by either said first or said second means for calculating.

2. An apparatus according to claim 1, further comprising means for calculating a pixel skipping ratio, wherein said pixel data segmenting means segments said first color-pixel data according to said pixel skipping ratio.

3. An apparatus according to claim 2, wherein said pixel-skipping ratio calculating means determines said pixel skipping ratio according to the numbers of pixels pertaining to both said first and said second images.

4. An apparatus according to claim 3 further comprising means for deriving said first color-pixel data, and means for displaying said second image.

5. An apparatus according to claim 4, wherein said means for deriving said first color-pixel data derives said first color-pixel data by scanning an original image along primary and secondary scanning directions which extend perpendicularly to each other; and
    said image segmenting means determines the number of pixels along the primary and secondary scanning directions in each pixel block according to said pixel skipping ratio.

6. An apparatus according to claim 5, wherein said pixel skipping ratio comprises a primary ratio $M_y$ and a secondary ratio $M_x$, corresponding to said primary scanning direction (y) and said secondary scanning direction (x) respectively, calculated by $$M_x = X_{max}/N_x$$

$$M_y = Y_{max}/N_y$$

where $X_{max}$ is the number of pixels derived from a scan of said first image in said secondary scanning direction (x), $Y_{max}$ is the number of pixels derived from a scan of said first image in said primary scanning direction (y), $N_x$ is the number of pixels which generate said second image in said secondary scanning direction (x), and $N_y$ is the number of pixels which generate said second image in said primary scanning direction (y).

7. An apparatus according to claim 1, wherein said first image is a scanned image; and
    said second means for storing color-pixel data stores the color-pixel data corresponding to the pixel block which is sequentially prior to said objective pixel block, and the color-pixel data corresponding to three pixel blocks adjacent to said object pixel block which are located on a scanning line sequentially prior to a scanning line on which said object pixel block exists.

8. An apparatus according to claim 1, wherein said second means for storing color-pixel data stores non-color data for a corresponding pixel block, in the event that the pixel block contains a plurality of color data.

9. An image processing apparatus for converting a first image derived as a plurality of first color-pixel data into a second image generated by a lesser number of second color-pixel data, comprising:

means for commanding edit functions;

means for generating said second image through a pixel skipping or pixel interpolation process in response to said means for commanding edit functions, said means for generating said second image including means for segmenting said first color-pixel data into a plurality of pixel blocks, each comprising a given plurality of said first color-pixel data, wherein each of said second color-pixel data corresponds to one of said pixel blocks;

first means for calculating each of said second color-pixel data according to first color-pixel data contained in a corresponding objective pixel block among said pixel blocks;

second means for calculating said second color-pixel data, including first means for storing first color-pixel data from said objective pixel block, and second means for storing first color-pixel data of said pixel blocks which are in the vicinity of said objective pixel block; wherein said first means for calculating cannot execute its function;

in the event the first means for storing color-pixel data contains color-pixel data different from that which is stored in the second means for storing color-pixel data, said second means for calculating being operative to produce color-pixel data corresponding to one pixel of said second image according to said different color-pixel data stored in said first means for storing color-pixel data;

in the event the first means for storing color-pixel data contains color-pixel data which is identical to that stored in said second means for storing color-pixel data, said second means for calculating being operative to produce color data corresponding to one pixel of said second image according to one of said identical color-pixel data stored in said first means for storing color-pixel data; and means for generating a second pixel according to said second color-pixel data as calculated by either said first or said second means for calculating; and means for displaying said second image composed of said second pixels.

10. An apparatus according to claim 9, wherein said means for generating said second image determines which of either of said pixel skipping or pixel interpolation processes is executed, according to said means for commanding said edit functions.

11. An apparatus according to claim 9, wherein said first image is a scanned image; and said means for storing said second color-pixel data stores the color-pixel data corresponding to the said pixel block which is sequentially prior to said objective pixel block, and the color-pixel data corresponding to three pixel blocks adjacent to said objective pixel block which are located on a scanning line sequentially prior to a scanning line on which said objective pixel block exists.

12. An apparatus according to claim 9, wherein said second means for storing stores non-color data for a corresponding pixel block, in case that the pixel block contains a plurality of color data.

13. A method for converting a first image derived as a plurality of first color-pixel data into a second image generated by a lesser number of second color-pixel data, comprising:

a step of segmenting said first color-pixel data into a plurality of pixel blocks, each consisting of a given plurality of said first color-pixel data, wherein each of said second color-pixel data corresponds to one of said pixel blocks;

a first step of calculating color data for each of said second color-pixel data according to first color-pixel data contained in a corresponding objective pixel block among said pixel blocks;

a second step of calculating said second color-pixel data, including first means for storing first color-pixel data from said objective pixel block, and second means for storing first color-pixel data of said pixel blocks which are in the vicinity of said objective pixel block, wherein said first means for calculating cannot execute its function;

in the event the first means for storing color-pixel data contains color-pixel data different from that which is stored in the second means for storing color-pixel data, said second means for calculating being operative to produce color-pixel data corresponding to one pixel of said second image according to said different color-pixel data stored in said first means for storing color-pixel data; and in the event said first means for storing color-pixel data contains color-pixel data which is identical to that which is stored in said second means for storing color-pixel data, said second means for calculating being active to produce color-pixel data corresponding to one pixel of said second image according to one of said identical color-pixel data stored in said first means for storing color-pixel data; and a step of generating a second pixel according to said second color-pixel data as calculated at either said first or said second steps of calculating.

14. A method according to claim 13, further comprising a step of calculating a pixel skipping ratio, wherein said first image color-pixel data is segmented according to said pixel skipping ratio at said image segmenting step.

15. A method according to claim 14 further comprising a step of deriving said first color-pixel data, and a step of displaying said second image.

16. A method according to claim 13, wherein said first image is a scanned image; and stored by said second step of storing step are the color-pixel data of the pixel block sequentially prior to said objective pixel block, and the color-pixel data of three pixel blocks adjacent to said objective pixel block which are located on a scanning line sequentially prior to a scanning line on which said objective pixel block exists.

17. A method according to claim 13, wherein data stored at said second step for storing are non-color data for a corresponding pixel block, in the event said pixel block contains a plurality of color data.

* * * * *